United States Patent Office 3,645,888
Patented Feb. 29, 1972

3,645,888
CATALYTIC REFORMING PROCESS
John C. Hayes, Palatine, Ill., assignor to Universal Oil Products Company, Des Plaines, Ill.
No Drawing. Continuation-in-part of application Ser. No. 828,762, May 28, 1969. This application June 26, 1970, Ser. No. 50,295
Int. Cl. C10g 35/08
U.S. Cl. 208—139
17 Claims

ABSTRACT OF THE DISCLOSURE

A gasoline fraction is catalytically reformed by contacting, in a reforming zone at reforming conditions, the gasoline fraction, hydrogen and water or a water-producing substance with a catalytic composite comprising a combination of a platinum group component, a germanium component and a halogen component with a porous carrier material. Key feature involves maintaining the total amount of water, or water equivalent, continuously entering the reforming zone in the range of about 10 to about 50 wt. p.p.m. of the gasoline fraction.

CROSS REFERENCES TO RELATED APPLICATIONS

This application is a continuation-in-part of my prior application entitled "Hydrocarbon Conversion Process and Catalytic Composite for Use Therein," which was filed, May 28, 1969 and assigned Ser. No. 828,762, now U.S. Pat. No. 3,578,584 issued May 11, 1971.

DISCLOSURE

The subject of the present invention is an improvement in a catalytic reforming process in which a relatively low octane-gasoline fraction is contacted with a unique catalyst containing platinum, germanium and halogen at conditions selected to result in a high octane product. More precisely, the invention involves the use in a process of this type of a critical amount of water, or its equivalent, in order to substantially improve the stability characteristics of this unique catalyst. In one aspect, the invention comprises a procedure for improving the performance of such a process after it has begun to deteriorate by the introduction into the process of a critical amount of water or its equivalent. In another aspect, the invention pertains to a reforming process using this unique catalyst which is started-up and continuously operated with the total amount of water, or its equivalent, continuously entering the reforming zone controlled within a hereinafter specified critical range so that the stability of the process is maintained at a high level throughout the duration of the reforming operation.

It is well known in the art that the requirements for an optimum process for transforming low octane stocks into high octane stocks, at minimum loss to undesirable products, involves a specially tailored catalytic environment that is designed to promote upgrading reactions for paraffins and naphthenes, which are the components of gasolines and naphthas that have the highest octane-improving potential. For paraffins the upgrading reactions are: isomerization to more highly branched paraffins, dehydrogenation to olefins, dehydrocyclization to aromatics, and hydrocracking to lower molecular weight paraffins. Of these, the dehydrocyclization reaction is the one that shows the maximum gain in octane number and is, consequently preferred. For naphthenes, the principal upgrading reactions involve dehydrogenation to aromatics and ring isomerization and dehydrogenation to aromatics; but the increase in octane number is not as dramatic here as in the case of dehydrocyclization of paraffins since the clear research octane number of most naphthenes is relatively high, typically in the range of 65 to 80. Accordingly, catalytic reforming operations are designed to provide an optimum mixture of the aforementioned reactions, generally employing for this purpose a multipurpose catalytic composite having at least a metallic dehydrogenation component and an acid-acting component.

In my prior application, I disclosed a unique dual-function catalytic composite which has singular characteristics of activity, selectivity and stability when utilized in processes for the conversion of hydrocarbons of the type that have traditionally used platinum-containing catalytic composites. In essence, this unique catalyst comprises a combination of a platinum group component, a germanium component and a halogen component with a porous carrier material. The singular characteristics of this catalyst are perhaps nowhere more evident than in a process for the catalytic reforming of a gasoline fraction in order to produce a high octane reformate product. My teaching in my prior application was, in substance, that this catalyst is extraordinarily sensitive to the presence of water in its environment and that it performs in an optimum fashion in a reforming process when the catalyst is maintained in a substantially water-free state. By the use of the expression "substantially water-free" I intended to describe the situation where the total amount of water, or water equivalent, continuously entering the reforming zone containing this unique catalyst is maintained at a level less than 50 wt. p.p.m., and preferably less than 20 wt. p.p.m. of the hydrocarbon charge stock, calculated as weight equivalent water in the charge stock. Although my subsequent experiments with this unique catalyst have confirmed that beneficial results can be achieved with this catalyst in a substantially water-free environment, I have now ascertained that a catalytic reforming process using this catalyst can be substantially improved by carefully controlling the amount of water, or its equivalent, which is introduced into the reforming zone within a relatively narrow range. More specifically, I have observed that the initially excellent activity or selectivity characteristics which this catalyst manifests in a substantially water-free environment are subject to degradation after an initial period corresponding to that required to process about 0.5 to about 15 barrels of hydrocarbon per pound of catalyst. Quite surprisingly, I have now determined that this performance degradation can be reversed by the addition of a critical amount of water, or its equivalent, to the reforming zone. And further, I have also determined that this performance degradation can be eliminated entirely if the process is started up and continuously operated with a critical amount of water continuously entering the reforming zone. More specifically, my finding is that the total amount of water entering the reforming zone should be held within the range of about 10 to about 50 wt. p.p.m. of the gasoline fraction in order to obtain the beneficial response of this catalyst to the presence of water. If the amount is below this level, activity and selectivity characteristics will not be stable, and if the amount is above this level, excessive yield loss and instability will occur. In short, the present invention essentially involves the concept of operating a reforming process with a catalyst that uses germanium to promote a platinum group metal and with a critical amount of water continuously entering the reforming zone. An attendant finding is that the maximum benefits of water addition are realized when halogen is also simultaneously added to the reforming zone in an amount sufficient to maintain the mole ratio of water entering the reforming zone to halogen entering the zone within the range of about 10:1 to about 100:1.

It is accordingly, one object of the present invention to provide an improvement in a process for the catalytic reforming of the gasoline fraction with a catalytic composite comprising a combination of a platinum group component, a germanium component and a halogen component with a porous carrier material. A second object is to provide a method for reversing activity and selectivity degradation in a reforming process of this type. Another object is to provide a method for maintaining the activity and selectivity characteristics of a catalyst containing platinum, germanium and halogen at a high level when it is utilized in a catalytic reforming operation.

Against this background, the present invention, is in one embodiment, a process for reforming a gasoline fraction which comprises contacting, in a reforming zone maintained at reforming conditions, the gasoline fraction, hydrogen and water or a water-producing substance with a catalytic composite comprising a combination of a platinum group component, a germanium component and a halogen component with a porous carrier material. This catalytic composite contains these components in amounts sufficient to result in a composite containing, on an elemental basis, about 0.01 to about 2 wt. percent platinum group metal, about 0.1 to about 5 wt. percent of germanium and about 0.1 to about 3.5 wt. percent halogen. Moreover, the total amount of water or water-producing substances continuously entering the reforming zone from any source is held to a level corresponding to about 10 to about 50 wt. p.p.m. of the gasoline fraction, calculated on the basis of equivalent water.

Another embodiment of the current invention is an improvement in a process for reforming a gasoline fraction wherein the gasoline fraction and hydrogen are contacted, in a reforming zone maintained at reforming conditions, with a unique catalytic composite of the type disclosed above in the first embodiment. Furthermore, this contacting is initially performed under substantially water-free conditions and the catalyst is observed to possess excellent activity and selectivity characteristics. After a period corresponding to the processing of about 0.5 to about 15 barrels of hydrocarbon per pound of catalyst, these excellent characteristics are observed to decay at an accelerated rate. The improvement of the present invention in this embodiment involves adding water or a water-producing substance to the reforming zone in an amount of water, or its equivalent, entering the zone from any source in the range corresponding to about 10 to about 50 wt. p.p.m. of the gasoline fraction. This water addition acts to sharply improve the activity and selectivity characteristics of the catalyst.

Other objects and embodiments of the instant invention involve additional details regarding suitable charge stocks, essential and preferred ingredients and amounts thereof, for this unique catalyst, essential and preferred water and halogen additives for the instant process, operating conditions for use in the reforming process and the like particulars. These are hereinafter given in the following detailed discussion of the essential and preferred elements of the present invention.

Before considering in detail the various elements of the present invention, it is convenient to define several of the expressions and terms used in this disclosure. The expression "water entering the reforming zone" means the total quantity of water, or of substances which are converted to water under the conditions maintained within the reforming zone, which enters the reforming zone from any source calculated on the basis of equivalent water and expressed as wt. p.p.m. of the gasoline fraction which is also entering the reforming zone. The term "activity" refers to the ability of a catalyst to produce a $C_5+$ product of the required quality as measured by octane number at a given severity level where severity level means the conditions utilized: that is, inlet reactor temperature, reactor pressure, hydrogen to hydrocarbon mole ratio and liquid hourly space velocity (LHSV). The term "selectivity" is intended to measure the ability of the catalyst when it is employed in a catalytic reforming process to produce $C_5+$ yield of the required octane relative to the amount of the gasoline fraction which is charged thereto. The term "stability" is intended to measure the ability of the catalyst to maintain initial levels of activity and selectivity; that is, it refers to the rate of change with time of the activity and selectivity parameters. It is to be noted that the terms "catalyst" and "catalytic composite" are used herein in an interchangeable and equivalent manner.

The hydrocarbon charge stock that can be reformed in accordance with the improved process of the present invention is generally a gasoline fraction containing naphthenes, paraffins and aromatics. These gasoline fractions can include straight run gasolines, natural gasolines, synthetic gasolines, cracked gasolines and the like charge stocks. In some cases, it is advantageous to charge thermally or catalytically cracked gasolines, mixtures of straight run and cracked gasoline and various other mixtures of hydrocarbons which are well known to those skilled in the reforming art. Generally, the gasoline fraction will boil within the range of about 50 to about 425° F., with an initial boiling point of about 50 to about 300° F. and an end boiling point within the range of about 250 to 425° F. In many cases this gasoline fraction will be a high boiling fraction such as a heavy naphtha boiling within the range of $C_7$ to 400° F. It is also within the scope of the present invention to charge to the present invention pure paraffins, pure naphthenes or mixtures of paraffins or naphthenes which boil in the gasoline boiling range and which are to be converted to aromatics.

The concentrations of sulfur-containing compounds, nitrogen-containing compounds and of oxygen-containing compounds contained in this hydrocarbon charge must be carefully cotrolled. In general, it is essential that the concentrations of these contaminants be reduced to relatively low levels prior to the introduction of the charge stock into the instant process. Any suitable pretreatment method known to those skilled in the catalytic reforming art may be utilized to accomplish the desired reduction in contaminant levels. Typically, good results are obtained with a mild hydrogenation treatment; for example, by subjecting the hydrocarbon charge stock to hydrorefining, hydrotreating, hydrodesulfurization, and the like contaminant removing process. Usually, these pretreatment procedures involve contacting the charge stock and hydrogen with a suitable supported cobalt- and/or molybdenum-containing catalyst at conditions selected to result in cleavage of C—S, C—N and C—O bonds. The details associated with these pretreatment methods are well known to those skilled in the art and will not be repeated here, but this required pretreatment is mentioned herein in order to emphasize the fact that these contaminants in the charge stock must be reduced to relatively low levels. In the case of sulfurous and nitrogeneous contaminants, the desired level is less than 2 wt. p.p.m. of the charge stock and preferably less than 1 wt. p.p.m. of the charge stock of sulfur and nitrogen, respectively. The amount of water and water-producing compounds contained in the charge stock must likewise be reduced to a level less than 5 wt. p.p.m., calculated as equivalent water and preferably less than 1 wt. p.p.m. The purpose for removing all of the water and water-producing compounds from the hydrocarbon charge stock prior to its introduction into the reforming zone is designed to facilitate careful control of the water level continuously entering the reforming zone. It is possible that the critical amount of water necessary for the improvement of the present invention could be achieved by adjusting the severity of the catalytic pretreatment so that the required amount of water or water-equivalent is left in the partially treated charge stock; however, this last procedure would be extremely difficult to accomplish except in the case where the sulfurous and nitrogenous contaminants in the untreated stock are extremely low. In sum, the hydrocarbon charge stock passed to the process of the present invention should be substantially free of sulfurous, nitrogenous and water-producing contaminants.

An essential feature of the improved process of the present invention involves the use of a catalytic composite comprising a combination of a platinum group component, a germanium component and a halogen component with a porous carrier material. Considering first the porous carrier material, it is preferred that the mateial be a poous adsorptive, high-surface area support having a surface area of about 25 to about 500 m.²/gm. The porous carrier material should be relatively refractory to the conditions utilized in the hydrocarbon conversion process, and it is intended to include within the scope of the present invention carrier materials which have traditionally been utilized in dual-function hydrocarbon conversion catalysts such as: (1) activated carbon, coke, or charcoal; (2) silica or silica gel, clays and silicates including those synthetically prepared and naturally occurring, which may or may not be acid treated, for example, attapulgus clay, china clay, diatomaceous earth, fuller's earth, kaolin, kieselguhr, pumice, etc.; (3) ceramics, porcelain, crushed firebrick, and bauxite; (4) refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silica-zirconia, etc.; (5) crystalline aluminosilicates such as naturally occurring or synthetically prepared mordenite and/or faujasite, either in the hydrogen form or in a form which has been treated with multi-valent cations; and, (6) combination of one or more elements from one or more of these groups. The preferred porous carrier materials are refractory inorganic oxides, with best results obtained with an alumina carrier material. Suitable alumina materials are the crystalline aluminas known as the gamma-, eta-, and theta-aluminas, with gamma giving best results. In addition, in some embodiments the alumina carrier material may contain minor proportions of other well known refractory inorganic oxide such as silica, zirconia, magnesia, etc.; however, the preferred carrier material is substantially pure gamma or eta-alumina. Preferred carrier mateials have an apparent bulk density of about 0.3 to about 0.7 gm./cc. and surface area characteristics such that the average pore diameter is about 20 to 300 angstroms, the pore volume is about 0.1 to about 1.0 ml./gm. and the surface area is about 100 to about 500 m.²/gm. In general, best results are typically obtained with a gamma-alumina carrier material which is used in the form of spherical particles having: a relatively small diameter (i.e. typically about 1/16 inch), an apparent bulk density of about 0.5 gm./cc., a pore volume of about 0.4 ml./gm., and a surface area of about 175 m.²/gm.

The preferred alumina carrier material may be prepared in any suitable manner and may be synthetically prepared or natural occurring. Whatever type of alumina is employed it may be activated prior to use by one or more treatments including drying, calcination, steaming, etc., and it may be in a form known as activated alumina, activated alumina of commerce, porous alumina, alumina gel, etc. For exmple, the alumina carrier may be prepared by adding a suitable alkaline reagent, such as ammonium hydroxide to a salt of aluminum such as aluminum chloride, aluminum nitrate, etc., in an amount to form an aluminum hydroxide gel which upon drying and calcining is converted to alumina. The alumina may be formed in any desired shape such as spheres, pills, cakes, extrudates, powders, granules, etc., and utilized in any desired size. For the purpose of the present invention, a particularly preferred form of alumina is the sphere; and alumina spheres may be continuously manufactured by the well known oil drop method which comprises: forming an alumina hydrosol by any of the techniques taught in the art and preferably by reacting aluminum metal with hydrochloric acid, combining the hydrosol with a suitable gelling agent and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 300° F. to about 400° F. and subjected to a calcination procedure at a temperature of about 850° F. to about 1300° F. for a period of about 1 to about 20 hours. This treatment effects conversion of the alumina hydrogel to the corresponding crystalline gamma-alumina. See the teachings of U.S. Pat. No. 2,620,314 for additional details.

One essential constituent of the unique catalyst is a germanium component. The germanium component is preferably present in the composite in an oxidation state above that of the elemental metal. That is to say, the germanium component should exist in the catalytic composite in either the +2 or +4 oxidation state with the latter being the most likely state. Accordingly, the germanium component is believed to be present in the composite as a chemical compound, such as the oxide, sulfide, halide, etc., wherein the germanium is in the required oxidation state, or as a chemical combination with the carrier material in which combination the germanium exists in this higher oxidation state. On the basis of the evidence currently available, it is believed that the germanium component in the subject composition exists as germanous or germanic oxide.

This germanium component may be incorporated in the catalytic composite in any suitable manner known to the art such as by coprecipitation or cogellation with the porous carrier material, ion exchange with the gelled carrier material or impregnation with the carrier material either after or before it is dried and calcined. It is to be noted that it is intended to include all conventional methods for incorporating a metallic component in a catalytic composite. One method of incorporating the germanium component involves coprecipitating it during the preparation of the preferred carrier material, alumina. This method typically involves the addition of a suitable soluble germanium compound such as germanium tetrachloride to the alumina hydrosol and then combining the hydrosol with a suitable gelling agent and dropping the resulting mixture into an oil bath, etc., as explained in detail hereinbefore. After drying and calcining the resulting gelled carrier material there is obtained an intimate combination of alumina and germanium oxide. A preferred method of incorporating the germanium component into the catalytic composite involves utilization of a soluble, decomposable compound of germanium to impregnate the porous carrier material. In general, the solvent used in this impregnation step is selected on the basis of the capability to dissolve the desired germanium compound and is preferably an aqueous, acidic solution. Thus, the germanium component may be added to the carrier material by commingling the latter with an aqeous, acidic solution of suitable germanium salt or suitable compound of germanium such as germanium tetrachloride, germanium difluoride, germanium dioxide, germanium tetrafluoride, germanium di-iodide, germanium monosulfide and the like compounds. A particularly preferred impregnation solution comprises germanium dissolved in chlorine water. Another preferred impregnation solution is germanium tetrachloride dissolved in anhydrous ethanol. In general, the germanium component can be incorporated either prior to, simultaneously with, or after the platinum group component is added to the carrier material. However, I have found that excellent results are obtained when the germanium component is incorporated simultaneously with the platinum group component. In fact, I have determined that a preferred impregnation solution contains chloroplatinic acid, hydrogen chloride, and germanium dissolved in chlorine water.

Regardless of which germanium compound is used in the preferred impregnation step, it is important that the germanium component be uniformly distributed throughout the carrier material. In order to achieve this objective it is necessary to maintain the pH of the impregnation solution in a range of about 1 to about 7 and to dilute the impregnation solution to a volume which is substantially in excess of the volume of the carrier material which is impregnated. It is preferred to use a volume ratio of impregnation solution to carrier material of at least 1.5:1 and preferably about 2:1 to about 10:1 or more. Similarly, it is preferred to use a relatively long contact times during the impregnation step ranging from about ¼ hour up to about ½ hour or more before drying to remove excess solvent in order to insure a high dispersion of the germanium component on the carrier material. The carrier material is, likewise, preferably constantly agitated during this preferred impregnation step.

As indicated above, this unique catalyst also contains a platinum group component. Although the process of the present invention is specifically directed to the use of a catalytic composite containing platinum, it is intended to include other platinum group metals such as palladium, rhodium, ruthenium, osmium, and iridium. The platinum group component, such as platinum may exist within the final catalytic composite as a compound such as an oxide, sulfide, halide, etc., or as an elemental metal or in combination with one or more of the other ingredients of the catalyst. Generally, the amount of the platinum group component present in the final catalyst composite is small compared to the quantities of the other components combined therewith. In fact, the platinum group component generally comprises about 0.01 to about 2 wt. percent of the final catalytic composite, calculated on an elemental basis. Excellent results are obtained when the catalyst contains about 0.05 to about 1 wt. percent of the platinum group metal. The preferred platinum group component is platinum or a compound of platinum.

The platinum group component may be incorporated in the catalytic composite in any suitable manner such as coprecipitation or cogellation with the preferred carrier material, or ion exchange or impregnation thereof. The preferred method of preparnig the catalyst involves the utilization of a water-soluble, decomposable compound of a platinum group metal to impregnate the carrier material. Thus, the platinum group component may be added to the support by commingling the latter with an aqueous solution of chloroplatinic acid. Other water-soluble compounds of platinum group metals may be employed in impregnation solutions and include ammonium chloroplatinate, bromoplatinic acid, platinum dichloride, platinum tetrachloride hydrate, platinum dichlorocarbonyldichloride, dinitrodiaminoplatinum, palladium dichloride, palladium nitrate, palladium sulfate, chloropalladic acid, etc. The utilization of a platinum group compound containing halogen, such as chloroplatinic acid, is preferred since it facilitates the incorporation of both the platinum group component and at least a minor quantity of the halogen component in a single step. Hydrogen chloride or the like acid is also generally added to the impregnation solution in order to further facilitate the incorporation of the halogen component and to aid in the distribution of the metallic component throughout the carrier material. In addition, it is generally preferred to impregnate the carrier material after it has been calcined in order to minimize the risk of washing away the valuable platinum metal compounds; however, in some cases it may be advantageous to impregnate the carrier material when it is in a gelled state.

Another essential constituent of the unique catalyst is the halogen component. Although the precise form of the chemistry of the association of the halogen component with the carrier material is not entirely known, it is customary in the art to refer to the halogen component as being combined with the carrier material or with the other ingredients of the catalyst. This combined halogen may be either fluorine, chlorine, iodine, bromine, or mixtures thereof. Of these, fluorine and particularly chlorine are preferred. The halogen may be added to the carrier material in any suitable manner either during preparation of the carrier material or before or after the addition of the other components. For example, the halogen may be added at any stage of the preparation of the carrier material or to the calcined carrier material as an aqueous solution of a suitable halogen-containing compound such as hydrogen fluoride, hydrogen chloride, hydrogen bromide, ammonium chloride, etc. The halogen component or a portion thereof may be combined with the carrier material during the impregnation of the latter with the platinum group component; for example, through the utilization of a mixture of chloroplatinic acid and hydrogen chloride. In another situation, the alumina hydrosol which is typically utilized to form the preferred alumina carrier material may contain halogen and thus contribute at least a portion of the halogen component to the final composite. For reforming, the halogen is combined with the carrier material in an amount sufficient to result in a final composite that contains about 0.1 to about 3.5 wt. percent and preferably about 0.5 to about 1.5% by weight of the halogen calculated on an elemental basis. The preferred halogen component is chlorine or a compound thereof.

Regarding the amount of the germanium component contained in the composite, it is preferably sufficient to constitute about 0.01 to about 5 wt. percent of the final composite, calculated on an elemental basis, although substantially higher amounts of germanium may be utilized in some cases. Best results are typically obtained with about 0.05 to about 2 wt. percent germanium. Irrespective of the absolute amounts of the germanium component and the platinum group component utilized, the atomic ratio of germanium to the platinum group metal contained in the catalyst is preferably selected from the range of about 0.3:1 to about 10:1, with best results achieved at an atomic ratio of about 0.6:1 to 6:1. This is particularly true when the total content of the germanium component plus the platinum group component in the catalytic composite is fixed in the range of about 0.1 to about 3 wt. percent thereof, calculated on an elemental germanium and platinum group metal basis.

Regardless of the details of how the components of the catalyst are combined with the porous carrier material, the final catalyst generally will be dried at a temperature of about 200 to about 600° F. for a period of from about 2 to about 24 hours or more, and finally calcined or oxidized at a temperature of about 700° F. to about 1100° F. in an air atmosphere for a period of about 0.5 to about 10 hours in order to convert the metallic components substantially to the oxide form. Best results are generally obtained when the halogen content of the catalyst is adjusted during the calcination step by including a halogen or a halogen-containing compound in the air atmosphere utilized. In particular, when the halogen component of the catalyst is chlorine, it is preferred to use a mole ratio of $H_2O$ to HCl of about 20:1 to about 100:1 during at least a portion of the calcination step in order to adjust the final chlorine content of the catalyst to a range of about 0.5 to about 1.5 wt. percent.

It is preferred that the resultant calcined catalytic composite be subjected to a substantially water-free reduction step prior to its use in the conversion of hydrocarbons. This step is designed to insure a uniform and finely divided dispersion of the metallic component throughout the carrier material. Preferably, substantially pure and dry hydrogen (i.e., less than 20 vol. p.p.m. $H_2O$) is used as the reducing agent in this step. The reducing agent is contacted with the calcined catalyst at conditions including a temperautre of about 800° F. to about 1000° F. selected to reduce the platinum group component to the metallic state while maintaining the germanium component in an oxidized state. This reduction step may be performed in situ as part of a start-up sequence if precautions are taken to predry the plant to a substantially water-free state and if substantially water-free hydrogen is used. In order to minimize the danger of reducing the germanium component during this step, the duration of this step is preferably less than two hours, and, more typically, about one hour.

The resulting reduced catalytic composite may, in some cases, be beneficially subjected to a presulfiding step designed to incorporate in the catalytic composite from about 0.05 to about 0.5 wt. percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 50° F. up to about 1000° F. It is generally a good practice to perform this presulfiding step under substantially water-free conditions.

According to the present invention, the catalytic reforming process involves contacting the gasoline fraction, hydrogen and water or water-producing substances with a catalyst of the type described above in a reforming zone maintained at reforming conditions. This contacting operation may be accomplished by means of any of the systems disclosed in the art for bringing together these reactants with the catalyst, such as a fixed bed system, a fluidized catalyst system or a batch type operation; however, in view of the danger of attrition losses of the valuable catalyst and of well known operational advantages, it is preferred to use a fixed bed system. In this system, a hydrogen-rich gaseous stream and the charge stock are preheated by any suitable preheating means to the desired reaction temperature and then are passed in admixture with water or a water-producing compound into the reforming zone containing a fixed bed of this unique catalyst. It is, of course, understood that the reforming zone may be one or more separate reactors with suitable heating means therebetween to compensate for the endothermic nature of the reactions taking place in a catalytic reforming zone. It is also to be noted that the reactants are typically in vapor phase, and may be contacted with the catalyst bed in either upward, downward, or radial flow fashion, with the latter being preferred.

In one mode of operation of the improved process of the present invention, the reforming process is started-up and lined-out under substantially water-free conditions which are achieved by careful control of the well known sources of water involved in a catalytic reforming system. This substantially water-free condition is ordinarily achieved by carefully drying both the catalyst and the reforming system during the start up of the process by circulating a relatively dry gas stream at a relatively high temperature. Coupled with this initial drying step, it is ordinarily a good practice to dry both the hydrogen-rich gas stream and the hydrocarbon charge stock to relatively low levels. In many cases, the efficiency of the catalytic contaminant-removing pretreatment operation on the hydrocarbon charge stock is sufficient to insure that the amount of water, or its equivalent, contained in the charge stock is less than 5 wt. p.p.m. and more typically less than 1 wt. p.p.m. In consequence, the hydrocarbon charge stock does not ordinarily have to be dried when it has been properly pretreated. Similarly, the hydrogen-rich stream is ordinarily a recycle stream obtained from the effluent of the reforming zone, and if the hydrocarbon charge stock has been properly pretreated, the hydrogen stream will ordinarily contain less than 10 vol. p.p.m. of water and not require any further drying. On the other hand, in the case where water enters the system from any source, either due to improper treatment of the charge stock or due to improper drying of the catalyst or the reforming zone, it is within the scope of the present invention to use suitable drying means to dry the charge stock and the recycle hydrogen stream. Suitable drying means are conventional solid adsorbents or desiccants having a high selectivity for water such as silica gel, activated alumina, molecular sieves, anhydrous calcium sulfate, high surface area sodium and the like materials. Regardless of how this substantially water-free condition is obtained, it is quantitatively defined to be achieved when the total amount of water, or its equivalent entering the reforming zone is fixed at a level less than 10 wt. p.p.m. of the charge stock and preferably less than 5 wt. p.p.m. of the charge stock. In accordance with this first mode of operation, this substantially water-free state is maintained for an initial period corresponding to the amount of time necessary to process about 0.5 to about 15 barrels of the gasoline fraction per pound of catalytic composite. This water-free operation is generally continued until some degradation in the activity and selectivity characteristics of the catalyst is noted. Ordinarily, a preferred criterion for monitoring these characteristics is a $C_5+$ yield, and when this parameter starts to rapidly decay, this first period should be terminated. A preferred procedure is to terminate when the initial line-out value of $C_5+$ yield has dropped about 1 to 2 vol. percent or more. An alternative criterion which can also be utilized is based on the purity of the hydrogen recycle stream—a marked deviation in this last parameter from initial value being also indicative of the onset of process instability. After this water-free operation is terminated, water injection is commenced in the manner hereinafter indicated.

A second mode of operation of the improved process of the present invention involves the presence of the hereinafter specified critical amount of water during the start-up of the process and continuously thereafter. In this mode of operation, it is necessary to carefully control all of the sources of water entering the reforming zone so that a process is started up and lined-out with the required quantity of water continuously entering the zone. Any of the drying means mentioned above in the discussion of the first mode of operation may be utilized to achieve the desired water level. In fact, as was pointed out hereinbefore, ordinarily the water level in the charge stock has been reduced to extremely low levels by the catalytic pretreatment procedure coupled with the customary stripping step which follows this pretreatment. In this latter case, it is generally only required to add the required amount of water or its equivalent to the hydrocarbon charge stock in order to control the water level to the reforming zone.

Regardless of which mode of operation is used, it is an essential feature of my invention that at some point in the process water or a water-producing substance is continuously introduced into the reforming zone in an amount corresponding to about 10 to about 50 wt. p.p.m. of the hydrocarbon charge stock, calculated on an equivalent water basis. It is to be noted that this amount of water is intended to include the total amount of equivalent water entering the reforming zone in any manner including that contained in the hydrocarbon charge stock, that present in the hydrogen stream, and that independently introduced into the reforming zone. Depending upon whether or not the recycle hydrogen stream is dried, it is generally a preferred procedure to add either all or a portion of the required amount of water to the charge stock. In the cases where once through hydogen is used or where the recycle hydrogen stream is dried down to a level substantially less than 5 vol. p.p.m. water and water is not independently introduced into the zone, substantially all of the water entering the reforming zone will come from that admixed with the hydrocarbon charge stock. On the other hand, in the case where the recycle hydrogen stream is not dried, an amount of water introduced into the charge stock will build-up and accumulate in the recycle hydrogen stream until an equilibrium condition is established. Depending upon the hydrogen to hydrocarbon mole ratio used, at equilibrium conditions, the total amount of water entering the reforming zone in this latter case will be approximately two to six times the amount added to the charge stock. It is to be noted that at least a portion of the required amount of water can be introduced into the zone by saturating a portion of the hydrogen stream with water.

As indicated hereinbefore, the preferred procedure for control of water is to treat the hydrocarbon charge stock so that the amount of water or water-producing substances contained therein is substantially less than 5 wt. p.p.m. and more typically less than 1 wt. p.p.m. The required amount of water for the process of the present invention is then achieved by introducing into the reforming zone a suitable water additive. In general, any suitable water additive can be utilized to supply the required quantity of water to the reforming zone and these include water and substances which produce water under the conditions maintained within the reforming zone. Typical of these latter substances are oxygen and reducible, oxygen-containing organic compounds. Included within the class of suitable oxygen-containing compounds are aldehydes, ketones, alcohols, esters, and the like oxygen-containing organic compounds. For purposes of the present invention the preferred additive is an alcohol such as a $C_2$ to $C_8$ alcohol.

A preferred feature of the present invention is the use of a halogen additive in conjunction with the essential water additive. That is, it is preferred to add a halogen additive simultaneously with the water additive in an amount sufficient to result in a mole ratio of water entering the reforming zone to halogen entering the reforming zone selected from the range of about 10:1 to about 100:1, with best results obtained at a mole ratio of about 20:1 to about 60:1. This introduction of a halogen additive into the reforming zone can be most easily accomplished by adding a suitable halogen-containing compound to one of the streams entering the reforming zone. The preferred method is ordinarily to admix a halogen or a halogen-containing compound with the hydrocarbon charge stock. Although any of the halogens can be utilized for the purposes of the present invention, ordinarily best results are obtained when the halogen additive is chlorine or a chlorine-containing compound. Any suitable halogen additive can be utilized provided it is reducible at the conditions maintained in the reforming zone at least in part to the corresponding halide. Of course, hydrogen halide, per se, may also be used. Examples of suitable halogen additives are hydrogen chloride, hydrogen bromide, ammonium chloride, ammonium bromide, carbon tetrachloride and any of the $C_2$–$C_8$ alkyl halides. Excellent results are typically obtained with a $C_2$–$C_8$ alkyl chloride.

As indicated above, the reforming zone containing the unique catalyst is operated under reforming conditions selected to produce a high-octane $C_5+$ reformate. Although the pressure used in the reforming zone can range from about 0 to about 1000 p.s.i.g., the preferred pressure range is about 50 to about 350 p.s.i.g. Similarly, the temperature maintained at the inlet to the reforming zone is selected from the range of about 800 to about 1100° F. In addition, hydrogen is charged to the reforming zone in an amount sufficient to provide a hydrogen to hydrocarbon mole ratio of about 2:1 to about 20:1, with best results ordinarily obtained at a mole ratio of about 4:1 to 10:1. It is to be noted that this hydrogen may be supplied to the reforming zone on a once-through basis, although, the preferred procedure is to obtain the necessary hydrogen from the effluent recovered from the reforming zone. Another relevant parameter for the operation of this reforming zone is an LHSV which can in general be selected from the range of about 0.1 to about 0 hrs.$^{-1}$, with a value of about 0.5 to about 5 hrs.$^{-1}$ being preferred.

The following examples are given to illustrate the benefits and advantages associated with the improvement of the present invention. These examples are intended to be illustrative rather than restrictive.

In both of these examples, the catalyst used in all the runs was a combination of platinum, germanium and chlorine with a gamma-alumina carrier material in amounts sufficient to result in a catalyst containing 0.375 wt. percent platinum, 0.5 wt. percent germanium, and 0.9 wt. percent chlorine. This catalyst was used in the form of $\frac{1}{16}''$ spherical particles having an apparent bulk density of 0.5 g./m., a pore volume of about 0.35 cc./g. and a surface area of about 160 m.$^2$/g. This catalyst was prepared by using gamma-alumina particles which were manufactured in accordance with the procedure disclosed in U.S. Patent 2,620,314. The impregnation solution utilized comprised germanium tetrachloride dissolved in anhydrous ethanol in admixture with an aqueous solution of chloroplatinic acid and hydrogen chloride. After impregnation, the catalyst was dried and calcined in the manner previously described.

The tests described in both of these examples were performed in a laboratory scale reforming plant of conventional design comprising a reactor containing the catalyst, a hydrogen separation zone, a debutanizer column and conventional heating, pumping, compressing and cooling means. The flow scheme utilized essentially involved heating a mixture of the gasoline fraction and the hydrogen recycle stream to the desired conversion temperature. The resulting mixture was then passed down-flow into a reactor containing the catalyst as a fixed bed. An effluent stream was then withdrawn from the reactor, cooled to about 55° F. and passed to a separating zone wherein a hydrogen-rich gas phase separated from a liquid hydrocarbon phase. A portion of the gas phase was then passed through a high surface sodium scrubber and the resulting substantially water-free hydrogen stream was then recycled to the reforming zone. The excess of hydrogen over that needed to sustain plant pressure was recovered as excess separator gas. Likewise, the hydrocarbon phase from the separating zone was withdrawn and passed to a debutanizer column wherein light ends were taken overhead and a $C_5+$ product reformate stream recovered as bottoms.

In all cases, the test utilized was a high severity reforming test which was designed to measure, on an accelerated basis, the activity, selectivity and stability characteristics of the catalyst under the conditions of the test. Each run consisted of a series of periods of 24 hours each. Each of these test periods comprised a 12 hour line-out period followed by a 12 hour test period during which a product reformate was collected. The conditions employed in all runs were: reactor pressure of 100 p.s.i.g., an LHSV of 1.5 hrs.$^{-1}$, a hydrogen to hydrocarbon mole ratio of 4:1 and an inlet reactor temperature which was continuously adjusted through the test in order to achieve and maintain a $C_5+$ target octane of 102 F–1 clear. It is to be emphasized that these are exceptionally severe conditions, which are designed to reveal in a very short time period whether the catalyst being tested has superior reforming characteristics under the conditions of the test. In all of these runs, the same charge stock was utilized. Its characteristics are given in Table 1. It is to be noted that the charge stock contained approximately 6 wt. p.p.m. of equivalent water and in view of the fact that recycle scrubbing was employed, the total amount of water entering the reforming zone in the control cases was 6 wt. p.p.m. Of course, the runs in all cases were started up under carefully controlled conditions so that the other known sources of water, such as residual water in the plant and in the catalyst, were held to insignificant levels.

TABLE I.—ANALYSIS OF HEAVY KUWAIT NAPHTHA

| | |
|---|---|
| API gravity at 60° F. | 60.4 |
| Initial boiling point, ° F. | 184 |
| 10% boiling point, ° F. | 205 |
| 50% boiling point, ° F. | 256 |
| 90% boiling point, ° F. | 321 |
| End boiling point, ° F. | 360 |
| Sulfur, wt. p.p.m. | 0.5 |
| Nitrogen, wt. p.p.m. | 0.1 |
| Aromatics, vol. percent | 8 |
| Paraffins, vol. percent | 71 |
| Naphthenes, vol. percent | 21 |
| Water, wt. p.p.m. | 5.9 |
| Octane No., F–1 clear | 40 |

Example I

This example is designed to study the response of this unique catalyst to water addition after a period of substantially water-free operation.

Two separate runs were made with separate portions of the catalyst. Run A was made under substantially water-free conditions for its entirety. Run B on the other hand, was made under substantialyy water-free conditions for the first three periods and thereafter with 20 wt. p.p.m., of t-butyl alcohol added to the gasoline fraction. The results of these two runs are presented in Table II in terms of amounts of water entering the reforming zone expressed as wt. p.p.m. of the charge stock, $C_5+$ yield expressed as vol. percent of the charge stock, inlet temperature to the reactor necessary to achieve and maintain target octane in ° F. and purity of the hydrogen recycle stream expressed in mole percent.

TABLE II.—RESULTS OF WATER STUDY

| | Water wt., p.p.m. | | $C_5+$, vol. percent | | T.,° F. | | $H_2$, vol. percent | |
|---|---|---|---|---|---|---|---|---|
| Run | A | B | A | B | A | B | A | B |
| Period No.: | | | | | | | | |
| 1 | 6 | 6 | 78.2 | | | 964 | 86.7 | 86.2 |
| 2 | 6 | 6 | 78.2 | 78.5 | 966 | 972 | 87 | 87.3 |
| 3 | 6 | 6 | 77.1 | 77.1 | 987 | 984 | 86.8 | 86.5 |
| 4 | 6 | 26 | 76.9 | 75.1 | 995 | 994 | 86.1 | 85.2 |
| 5 | 6 | 26 | 76.3 | 77.7 | 1,005 | 1,004 | 85.4 | 87.2 |
| 6 | 6 | 26 | 76 | 76.9 | 1,019 | 1,006 | 85 | 87.2 |
| 7 | 6 | 26 | 75.5 | 75.7 | 1,032 | 1,008 | 84.3 | 86.1 |
| 8 | 6 | 26 | 72.4 | 76.1 | 1,047 | 1,016 | 80.5 | 86.3 |
| 9 | 6 | 26 | | 76.2 | | 1,026 | | 86.7 |
| 10 | 6 | 26 | | 75.2 | | 1,034 | | 84.4 |

With reference to Table II, it can be ascertained that the principal effects of water addition were to produce sharp improvements in the activity and selectivity characteristics of the catalyst. As was pointed out hereinbefore, activity of the catalyst ordinarily is best judged by observing the temperature required to maintain the desired octane level. From the data on temperature required for octane, it can be seen that in Run A the activity of the catalyst was quite good but that it was decreasing at an accelerated rate after an initial period of fairly stable operation. In contrast the run with water addition, Run B, showed a rather remarkable recovery of activity shortly after water was added. Similarly, selectivity is ordinarily best judged by looking at $C_5+$ yield at octane, although an acceptable alternative criterion is purity of the hydrogen stream. Judging selectivity characteristics of the catalyst from the results observed for $C_5+$ yield and hydrogen, it can be seen that the effect of water addition was an immediate and material improvement in selectivity characteristics. For example, the $C_5+$ yield recovered to approximately its initial level and appeared to be fairly stable. Similarly, hydrogen production which had been dropping rapidly increased rapidly and returned to approximately its initial level. In sum, these results directly illustrate the ability of the improvement of the present invention to reverse activity and selectivity decay for this unique catalyst.

Example II

A series of runs were made with various amounts of water entering the reforming zone in order to study the effects of different levels of water on a reforming process utilizing this reforming catalyst. The only material difference between these runs was the amount of water entering the reforming zone, and these amounts are presented in Table III for each of these runs. In addition, all of these runs except Run C and the first three periods of Run D were made with sufficient t-butyl chloride added to the charge stock to maintain the mole ratio of water to chlorine entering the reforming zone at a value of 39:1.

The results of these runs are presented in Tables IV, V, and VI in terms of observed reactor inlet temperatures necessary to achieve desired octane level in ° F. $C_5+$ yield expressed as vol. percent of the charge stock and recycle hydrogen purity expressed in mole percent.

TABLE III.—AMOUNTS OF WATER USED IN RUNS, WT. P.P.M.

| Period No. | 1 | 2 | 3 | 4 | 5 | 6 | 7 | 8 | 9 | 10 |
|---|---|---|---|---|---|---|---|---|---|---|
| Run: | | | | | | | | | | |
| C | 6 | 6 | 6 | 6 | 6 | 6 | | | | |
| D | 6 | 6 | 6 | 26 | 26 | 26 | 26 | 26 | 26 | 26 |
| E | 46 | 46 | 46 | 46 | 46 | 46 | 46 | 46 | 46 | 46 |
| F | 86 | 86 | 86 | 86 | 86 | 86 | | | | |

TABLE IV.—OBSERVED REACTOR INLET TEMPERATURES, ° F.

| Period No. | 1 | 2 | 3 | 4 | 5 | 6 | 7 | 8 | 9 | 10 |
|---|---|---|---|---|---|---|---|---|---|---|
| Run: | | | | | | | | | | |
| C | 968 | 976 | 986 | 990 | 996 | 1,004 | | | | |
| D | 964 | 972 | 984 | 994 | 1,004 | 1,006 | 1,008 | 1,016 | 1,026 | 1,034 |
| E | 969 | 978 | 987 | 993 | 999 | 1,005 | 1,012 | 1,022 | 1,035 | 1,048 |
| F | 976 | 990 | 999 | 1,006 | 1,016 | 1,024 | | | | |

TABLE V.—OBSERVED $C_5+$ YIELDS, VOLUME PERCENT

| Period No. | 1 | 2 | 3 | 4 | 5 | 6 | 7 | 8 | 9 | 10 |
|---|---|---|---|---|---|---|---|---|---|---|
| Run: | | | | | | | | | | |
| C | 78.7 | 76.9 | 77.9 | 78.7 | 77.8 | 76.4 | | | | |
| D | 78.5 | 77.1 | 75.1 | 77.7 | 76.9 | 75.7 | 76.1 | 76.2 | | 75.2 |
| E | 77.2 | 78.5 | 77.9 | 77.7 | 76.7 | 77.0 | | | | 72.2 |
| F | 76.0 | 77.4 | 77.6 | 77.6 | 76.7 | 75.9 | | | | |

TABLE VI.—OBSERVED HYDROGEN PURITY, VOLUME PERCENT

| Period No. | 1 | 2 | 3 | 4 | 5 | 6 | 7 | 8 | 9 | 10 |
|---|---|---|---|---|---|---|---|---|---|---|
| Run: | | | | | | | | | | |
| C | 88.3 | 86.5 | 87.6 | 88.1 | 87.1 | 85.8 | | | | |
| D | 86.2 | 87.3 | 86.5 | 85.2 | 87.4 | 87.7 | 86.1 | 86.2 | 86.2 | 84.3 |
| E | | 87.1 | 88.5 | 88.1 | 87.7 | 87.3 | 87.0 | 85.8 | 85.0 | 80.7 |
| F | 85.7 | 87.9 | 88.1 | 87.9 | 87.1 | 85.5 | | | | |

With reference now to the data presented in Tables III, IV and V, it can be seen that water addition can be utilized to stabilize the catalyst. For example, by comparing the results of Run D with Run E, it can be seen that the beneficial effect of water can be obtained either by adding water after a period of substantially water-free operation or by the continuous injection of water. Similarly, it can be ascertained from a comparison of Run F with Run C, that there is an upper limit to the amount of water which is beneficial. Run F obviously involved the addition of too much water because the temperature required to make octane was rather unstable. Although Run E appeared to give fairly good results, it is believed to be close to the upper limit of the amount of water that will give a beneficial response. It was operated at a water level corresponding to 46 wt. p.p.m. in the hydrocarbon charge stock and was clearly not as good as Run D. From this data it can be concluded that there is an upper and lower level for the amount of water necessary to see the beneficial response of the present invention. On the basis of this data, it appears that this range is about 10 to about 50 wt. p.p.m. of the hydrocarbon charge stock.

It is intended to cover by the following claims all changes and modifications of the above disclosure of the present invention which would be self-evident to a man or ordinary skill in the catalytic reforming art.

I claim as my invention:

1. A process for reforming a gasoline fraction comprising contacting, in a reforming zone maintained at reforming conditions, the gasoline fraction, hydrogen and water or a water-producing substance with a catalytic composite comprising a combination of a platinum group component, a germanium component and a halogen component with a porous carrier material in amounts sufficient to result in a composite containing, on an elemental basis, about 0.01 to about 2 wt. percent of the platinum group metal, about 0.01 to about 5 wt. percent of germanium and about 0.1 to about 3.5 wt. percent halogen, substantially all of said germanium being present in an oxidation state above that of the elemental metal and substantially all of said platinum group metal being present as the elemental metal, in which process the total amount of water or water-producing substances continuously entering the reforming zone from any source is controlled at about 10 to about 50 wt. p.p.m. of the gasoline fraction, calculated on the basis of equivalent water.

2. A process as defined in claim 1 wherein said platinum group component of said composite is platinum or a compound of platinum.

3. A process as defined in claim 1 wherein said halogen component of said composite is chlorine or a compound of chlorine.

4. A process as defined in claim 1 wherein the porous carrier material is alumina.

5. A process as defined in claim 1 wherein the germanium component of the composite is germanium oxide.

6. A process as defined in claim 1 wherein a halogen or halogen containing compound is also introduced into the reforming zone in an amount sufficient to result in a mole ratio of water entering the zone to halogen entering the zone selected from the range of about 10:1 to about 100:1.

7. A process as defined in claim 6 wherein said halogen or halogen-containing compound is chlorine or a chlorine-containing compound.

8. A process as defined in claim 1 wherein at least a portion of said water or water-producing substance is a reducible, oxygen-containing organic compound which is commingled with said gasoline fraction.

9. A process as defined in claim 1 wherein at least a portion of said water or water-producing substance is water which is admixed with said hydrogen.

10. In a process for reforming a gasoline fraction wherein the gasoline fraction and hydrogen are contacted, in a reforming zone maintained at reforming conditions, with a catalyst comprising a combination of a platinum group component, a germanium component and a halogen component with a porous carrier material in amounts sufficient to result in a catalyst containing, on an elemental basis, about 0.01 to about 2 wt. percent of the platinum group metal, about 0.01 to about 5 wt. percent germanium and about 0.1 to about 3.5 wt. percent halogen, substantially all of said germanium being present in an oxidation state above that of the elemental metal and substantially all of said platinum group metal being present as the elemental metal, wherein said contacting is initially performed under substantially water-free conditions and wherein the initially excellent activity and selectivity characteristics of said catalyst are observed to decay at an accelerated rate after an initial period during which about 0.5 to about 15 barrels of gasoline fraction have been processed per pound of catalyst, the improvement which comprises adding, after said initial period, water or a water-producing substance to the reforming zone in an amount sufficient to establish and maintain the total amount of water, or its equivalent, entering the zone from any source in the range corresponding to about 10 to about 50 wt. p.p.m. of the gasoline fraction, thereby sharply improving the activity and selectivity characteristics of said catalyst.

11. An improved process as defined in claim 10 wherein a halogen or a halogen-containing compound is also added to the reforming zone in an amount sufficient to result in a mole ratio of water entering the zone to halogen entering the zone selected from the range of about 10:1 to about 100:1.

12. An improved process as defined in claim 11 wherein said halogen or halogen-containing compound is a reducible, halogen-containing organic compound which is added to said gasoline fraction.

13. An improved process as defined in claim 11 wherein said halogen or halogen-containing compound is an alkyl chloride.

14. An improved process as defined in claim 10 wherein at least a portion of the water or water-producing substance entering the reforming zone is a reducible, oxygen-containing organic compound which is commingled with said gasoline fraction.

15. An improved process as defined in claim 14 wherein said reducible, oxygen-containing organic compound is a $C_2$ to $C_8$ alcohol.

16. An improved process as defined in claim 10 wherein said catalyst is a combination of platinum component, a germanium component and a chlorine component with an alumina carrier material.

17. A process as defined in claim 6 wherein said halogen-containing compound is an alkyl chloride.

References Cited
UNITED STATES PATENTS

| | | | |
|---|---|---|---|
| 2,861,959 | 11/1958 | Thorn et al. | 208—138 |
| 2,906,701 | 9/1959 | Stine et al. | 208—138 |
| 3,474,026 | 10/1969 | Derr et al. | 208—138 |
| 3,502,573 | 3/1970 | Pollitzer et al. | 208—138 |

HERBERT LEVINE, Primary Examiner

U.S. Cl. X.R.

208—138; 252—466 PT

Disclaimer 3,645,888.—*John C. Hayes*, Palatine, Ill. CATALYTIC REFORMING PROCESS. Patent dated Feb. 29, 1972. Disclaimer filed July 9, 1971, by the assignee, *Universal Oil Products Company*.

Hereby disclaims the portion of the term of the patent subsequent to May 11, 1988.

[*Official Gazette March 13, 1973.*]